(12) United States Patent
Park et al.

(10) Patent No.: US 11,353,755 B2
(45) Date of Patent: Jun. 7, 2022

(54) DISPLAY DEVICE

(71) Applicant: Samsung Display Co., Ltd., Yongin-Si (KR)

(72) Inventors: Sae Ron Park, Gimhae-si (KR); Jin Suek Kim, Suwon-si (KR); Sang Woo Kang, Suwon-si (KR); Eung Gyu Lee, Cheonan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/816,345

(22) Filed: Mar. 12, 2020

(65) Prior Publication Data
US 2021/0055595 A1 Feb. 25, 2021

(30) Foreign Application Priority Data
Aug. 22, 2019 (KR) .................. 10-2019-0103026

(51) Int. Cl.
| | |
|---|---|
| *G02F 1/1345* | (2006.01) |
| *G02F 1/1335* | (2006.01) |
| *G02F 1/1339* | (2006.01) |
| *G02F 1/1333* | (2006.01) |
| *G02F 1/1362* | (2006.01) |

(52) U.S. Cl.
CPC ...... *G02F 1/13452* (2013.01); *G02F 1/13394* (2013.01); *G02F 1/133512* (2013.01); *G02F 1/133514* (2013.01); *G02F 1/1339* (2013.01); *G02F 1/13458* (2013.01); *G02F 1/133388* (2021.01); *G02F 1/136222* (2021.01)

(58) Field of Classification Search
CPC ............ G02F 1/13394; G02F 1/13452; G02F 1/136222; G02F 1/133512; G02F 1/1341; G02F 1/13458; G02F 1/1345
See application file for complete search history.

(56) References Cited

U.S. PATENT DOCUMENTS

| | | | | |
|---|---|---|---|---|
| 6,683,671 | B1 * | 1/2004 | Morimoto | G02F 1/13394 |
| | | | | 349/155 |
| 2004/0195573 | A1 * | 10/2004 | Kim | H01L 27/12 |
| | | | | 257/72 |
| 2005/0253994 | A1 * | 11/2005 | Kamijima | G02F 1/133351 |
| | | | | 349/155 |
| 2014/0307208 | A1 * | 10/2014 | Hatakeyama | G02F 1/13394 |
| | | | | 349/106 |

(Continued)

FOREIGN PATENT DOCUMENTS

| | | |
|---|---|---|
| JP | 2003-186022 A | 7/2003 |
| KR | 10-2015-0047711 A | 5/2015 |

(Continued)

*Primary Examiner* — Alexander P Gross
(74) *Attorney, Agent, or Firm* — Innovation Counsel LLP

(57) ABSTRACT

A display device according to an exemplary embodiment of the present inventive concept includes: a first substrate including a display area and a non-display area; a second substrate overlapping the first substrate; a sealant disposed between the first substrate and the second substrate; and a stacked body disposed between the first substrate and the second substrate, disposed on an outermost edge of the non-display area, and disposed spaced apart from the sealant, wherein the stacked body includes a column spacer and a color filter stacked body in which at least two color filters are stacked.

28 Claims, 20 Drawing Sheets

(56) References Cited

U.S. PATENT DOCUMENTS

| | | | |
|---|---|---|---|
| 2014/0346496 A1* | 11/2014 | Ro | G02F 1/136227 257/43 |
| 2015/0062524 A1* | 3/2015 | Kim | G02F 1/1339 349/153 |
| 2016/0377905 A1* | 12/2016 | Choi | G02F 1/1339 257/72 |
| 2017/0336666 A1* | 11/2017 | Takasaki | G02F 1/1339 |
| 2018/0157078 A1* | 6/2018 | Jeon | G02F 1/133617 |
| 2019/0094633 A1 | 3/2019 | Song et al. | |
| 2019/0204638 A1 | 7/2019 | Park et al. | |

FOREIGN PATENT DOCUMENTS

| | | |
|---|---|---|
| KR | 10-2017-0002283 A | 1/2017 |
| KR | 10-2018-0047180 A | 5/2018 |
| KR | 10-2019-0035993 A | 4/2019 |

\* cited by examiner

DISPLAY DEVICE

CROSS-REFERENCE TO RELATED APPLICATION

This application claims priority to and the benefit of Korean Patent Application No. 10-2019-0103026 filed in the Korean Intellectual Property Office on Aug. 22, 2019, the entire contents of which are incorporated herein by reference.

BACKGROUND

(a) Field

The present disclosure relates to a display device, and particularly, it relates to a display device for controlling a sludge layer in a display device with a lateral side to which a pad portion is attached.

(b) Description of the Related Art

In general, a circuit board is connected to a display panel when a display panel is manufactured. For example, a circuit board is mounted on the display panel using a tape automated bonding (TAB) method which uses an anisotropic conductive film (ACF) as an adhesive layer.

Recently, design schemes on the display panel for reducing a bezel area (or a non-display area) have been researched in various ways. For example, a method for bonding the circuit board on a lateral side of the display panel has been attempted. To attach the circuit board on the lateral side of the display panel, a process for grinding the lateral side of the display panel is needed.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a display device for controlling formation of a sludge layer in the display device with a lateral side to which a pad portion is attached.

An exemplary embodiment of the present inventive concept provides a display device including: a first substrate including a display area and a non-display area; a second substrate overlapping the first substrate; a sealant disposed between the first substrate and the second substrate; and a stacked body disposed between the first substrate and the second substrate, disposed on an outermost edge of the non-display area, and disposed spaced apart from the sealant, wherein the stacked body includes a column spacer and a color filter stacked body in which at least two color filters are stacked.

The color filter stacked body may include a first color filter and a second color filter overlapping each other in a plan view, and the first color filter may be disposed closer to the first substrate than the second color filter is.

When the first color filter is red, the second color filter may be green or blue, and when the first color filter is green, the second color filter may be blue.

The color filter stacked body may include a first color filter, a second color filter, and a third color filter.

An area of the second color filter may be greater than an area of the first color filter, and a top surface and a side surface of the first color filter may be completely covered by the second color filter.

An area of the first color filter may correspond to an area of the second color filter.

An area of the second color filter may be lesser than an area of the first color filter.

A space between the sealant and the stacked body may be filled with air.

The stacked body may further include a gate conductive layer and a data conductive layer disposed between the first substrate and the color filter stacked body, and the gate conductive layer may directly contact the data conductive layer.

The display device may further include a pad portion disposed on a lateral side of the stacked body, and contacting the gate conductive layer and the data conductive layer on the lateral side.

The stacked body may further include a light blocking layer disposed on the second substrate, and a second electrode disposed on the light blocking layer.

The column spacer and a lateral side of the color filter stacked body may be exposed on the outermost edge.

A thickness of a column spacer in the non-display area may be equal to or less than a thickness of a column spacer in the display area.

A thickness of a color filter in the non-display area is equal to or less than a thickness of a color filter in the display area.

Another embodiment of the present inventive concept provides a display device including: a first substrate including a display area and a non-display area; a second substrate overlapping the first substrate; a sealant disposed between the first substrate and the second substrate; and a stacked body disposed between the first substrate and the second substrate, disposed on an outermost edge of the non-display area, and disposed spaced apart from the sealant, wherein the stacked body includes a color filter stacked body which includes a first color filter and a second color filter, an organic layer, and a column spacer.

The organic layer may be disposed between the color filter stacked body and the column spacer.

An area of the second color filter may be greater than an area of the first color filter, and a top surface and a side surface of the first color filter may be completely covered by the second color filter.

An area of the first color filter may correspond to an area of the second color filter.

An area of the second color filter may be less than an area of the first color filter.

The color filter stacked body may further include a third color filter disposed on the second color filter.

The stacked body may further include a gate conductive layer and a data conductive layer disposed between the first substrate and the color filter stacked body, and the gate conductive layer may directly contact the data conductive layer.

The display device may further include a pad portion disposed on a lateral side of the stacked body, and contacting the gate conductive layer and the data conductive layer on the lateral side.

Yet another embodiment of the present inventive concept provides a display device including: a first substrate including a display area and a non-display area; a second substrate overlapping the first substrate; a sealant disposed between the first substrate and the second substrate; a stacked body disposed between the first substrate and the second substrate, disposed on an outermost edge of the non-display area, and disposed spaced apart from the sealant; and a sludge layer disposed between the stacked body and the first substrate, wherein the stacked body includes a color filter stacked body which includes a first color filter and a second color filter, and a column spacer.

The sludge layer may include copper.

The stacked body may further include a gate conductive layer and a data conductive layer disposed between the first substrate and the color filter stacked body, and the gate conductive layer may directly contact the data conductive layer.

The sludge layer may be disposed between the gate conductive layer and the first substrate.

The display device may further include a pad portion disposed on a lateral side of the stacked body, and contacting the sludge layer, the gate conductive layer, and the data conductive layer on the lateral side.

An area of the second color filter may be greater than an area of the first color filter, and a top surface and a side surface of the first color filter may be completely covered by the second color filter.

An area of the first color filter may correspond to an area of the second color filter.

An area of the second color filter may be less than an area of the first color filter.

The color filter stacked body may further include a third color filter disposed on the second color filter.

According to the exemplary embodiments, the display device for controlling formation of a sludge layer in the display device with a lateral side to which a pad portion is attached is provided.

DETAILED DESCRIPTION OF THE EMBODIMENTS

Figure 1:
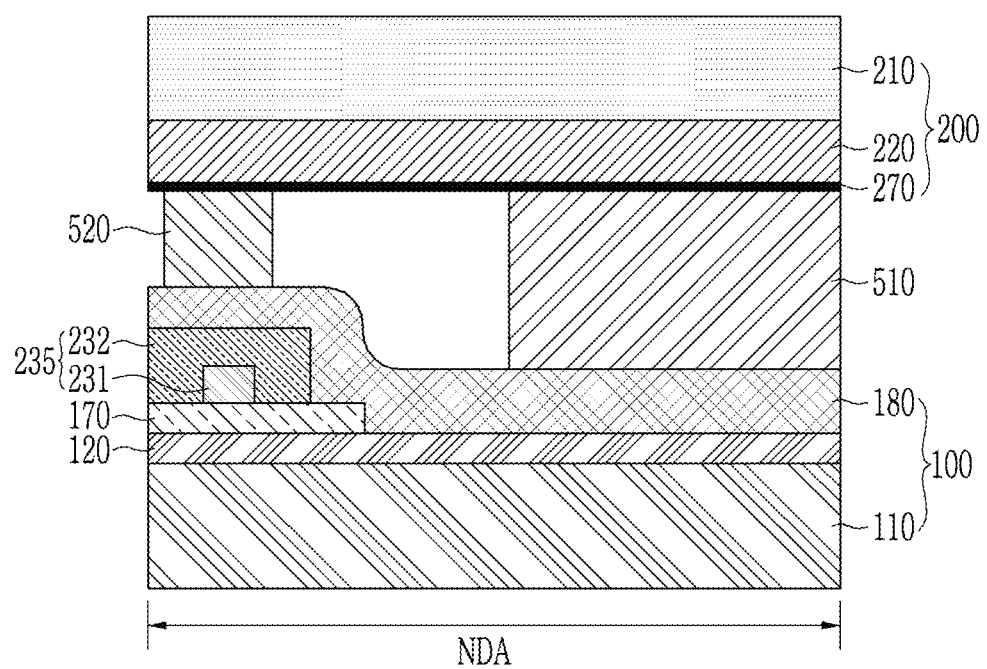
FIG. 1 shows a cross-section of a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

The drawings and description are to be regarded as illustrative in nature and not restrictive, and like reference numerals designate like elements throughout the specification.

The size and thickness of each configuration shown in the drawings are arbitrarily shown for better understanding and ease of description, and the present inventive concept is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

A display device according to an exemplary embodiment of the present inventive concept will now be described in detail with reference to accompanying drawings.

FIG. 1 shows a cross-section of a display device according to an exemplary embodiment of the present inventive concept. Referring to FIG. 1, the present inventive concept related to a structure of a non-display area (NDA) of the display device.

Figure 2:
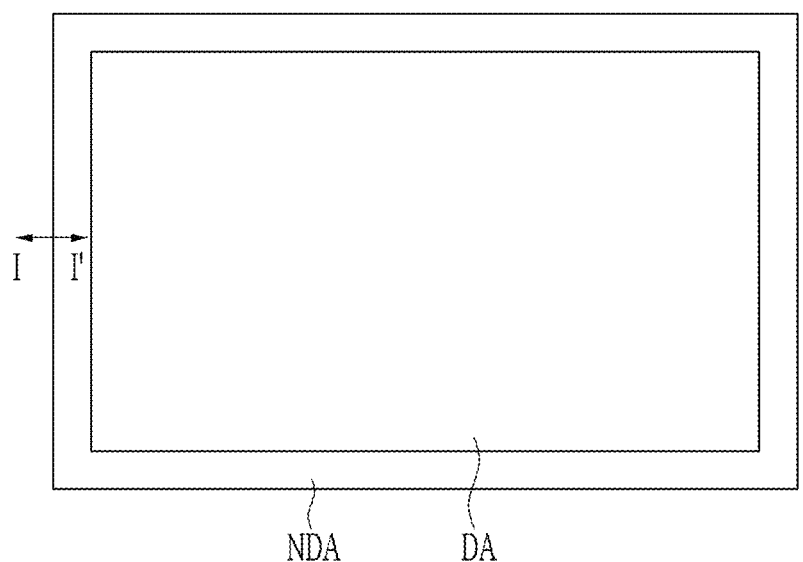
FIG. 2 shows a display area and a non-display area of a display panel.

FIG. 2 shows a display area (DA) and a non-display area (NDA) of a display panel 1000. FIG. 1 shows a cross-sectional view with respect to a line I-I' in FIG. 2.

Referring to FIG. 1, the display device according to the present exemplary embodiment includes a first display panel 100 and a second display panel 200. A sealant 510 is provided between the first display panel 100 and the second display panel 200. The respective display panels will now be described in detail.

The first display panel 100 includes a first substrate 110. A gate conductive layer 120 disposed on a same layer as a gate line of the display area (DA) is provided on the first substrate 110. The gate conductive layer 120 is formed with a same process as the gate line of the display area (DA) and it may include a same material as the gate line of the display area (DA). Therefore, a thickness of the gate conductive layer 120 may correspond to a thickness of the gate line of the display area (DA).

A data conductive layer 170 disposed on the same layer as a data line of the display area (DA) is provided on the gate conductive layer 120. The data conductive layer 170 is formed with a same process as the data line of the display area (DA) and it may include a same material as the data line of the display area (DA).

The gate conductive layer 120 may directly contact the data conductive layer 170. Therefore, to be described in detail, when the pad portion is attached to the lateral side of the display panel 1000, a contact area of the pad portion may increase and may reduce resistance.

A color filter stacked body 235 is provided on the data conductive layer 170. Referring to FIG. 1, the color filter stacked body 235 may include a first color filter layer 231 and a second color filter layer 232.

The first color filter layer 231 may be formed with the same process as the color filter provided in the display area (DA). The first color filter 231 may be a green color filter or a red color filter.

The second color filter layer 232 is provided on the first color filter layer 231. Referring to FIG. 1, an area of the second color filter layer 232 may be greater than an area of the first color filter layer 231, and as shown in FIG. 1, the second color filter layer 232 may be provided to completely cover a top surface and a side surface of the first color filter layer 231. In the present specification, the area refers to an area that is parallel to the first substrate 110.

The second color filter layer 232 may be a green color filter or a blue color filter. When the first color filter layer 231 is a red color filter, the second color filter layer 232 may be a green color filter or a blue color filter. When the first color filter layer 231 is a green color filter, the second color filter layer 232 may be a blue color filter.

FIG. 1 shows a configuration in which the first color filter layer 231 is completely covered by the second color filter layer 232, but shapes of the first color filter layer 231 and the second color filter layer 232 are not limited to the shape shown in FIG. 1, and they are modifiable in many ways. Modified exemplary embodiments will be described in a latter portion of the present specification.

Referring to FIG. 1, an organic layer 180 is provided on the second color filter layer 232. The organic layer 180 may be a same layer as the passivation layer provided between a color filter and a pixel electrode in the display area (DA). The passivation layer of the display area will be described in a latter portion of the present specification.

The second display panel 200 will now be described. A light blocking layer 220 is provided on a second substrate 210.

A second electrode 270 is provided on the light blocking layer 220. The second electrode 270 in the non-display area (NDA) is connected to the second electrode 270 provided in the display area (DA) and is formed in one piece.

A sealant 510 is provided between the first display panel 100 and the second display panel 200. The sealant 510 fills a space between the first display panel 100 and the second display panel 200 and prevents moisture or foreign particles from being enter into the display area (DA) from the outside. A column spacer 520 is separated from the sealant 510 and is provided between the first display panel 100 and the second display panel 200. The column spacer 520 may be formed with the same process as the column spacer 520 of the display area. A thickness of the column spacer 520 in the non-display area (NDA) may correspond to a thickness of the column spacer in the display area (DA). According to exemplary embodiments, the thickness of the column spacer 520 in the non-display area (NDA) may be less than the thickness of the column spacer in the display area (DA).

Referring to FIG. 1, the column spacer 520 is separated from the sealant 510 to provide an empty space between the column spacer 520 and the sealant 510. The empty space may be filled with air. In this instance, the distance between the column spacer 520 and the sealant 510 may be 0.1 mm to 0.8 mm. As the column spacer 520 is separated from the sealant 510, an influence to the sealant 510 and the display area (DA) during the polishing process before attaching a pad portion to the lateral side of the display panel may be minimized.

As shown in FIG. 1, regarding the display device according to an exemplary embodiment of the present inventive concept, a stacked body in which a gate conductor 120, a data conductor 170, a first color filter layer 231, a second color filter layer 232, an organic layer 180, a column spacer 520, a second electrode 270, and a light blocking layer 220 are stacked is provided on an outside of the sealant at an outermost edge of the non-display area (NDA).

Formation of agglomerated sludge between layers exposed during the polishing process for polishing a lateral side of the display device on which a pad is provided can be prevented and controlled by including a column spacer and at least two layers of the color filter stacked body 235 on the outermost of the non-display area (NDA).

Although not shown in FIG. 1, an alignment layer may be provided to overlap the sealant 510. The alignment layer may be an extension of the alignment layer provided in the display area (DA), and the alignment layer may overlap up to a center region of the sealant 510. That is, an alignment layer may be provided between the organic layer 180 and the sealant 510, and part of the sealant 510 may not overlap the alignment layer. This configuration is applicable to another exemplary embodiment in a like manner.

Effects of the present inventive concept will now be described in detail.

Figure 3:
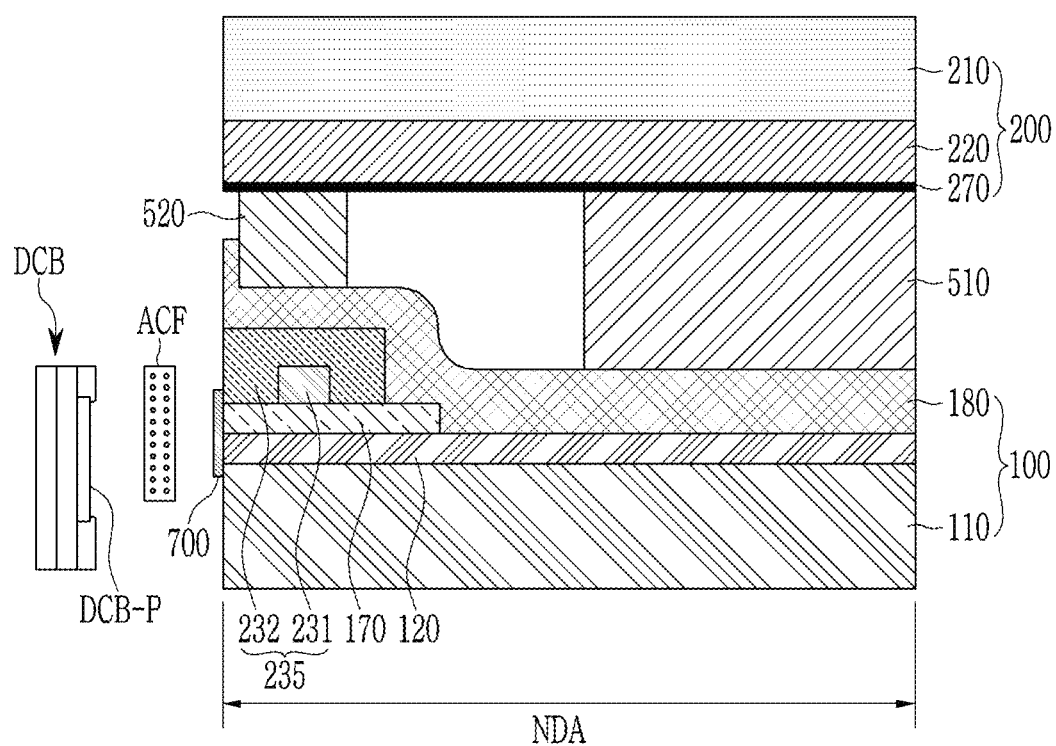
FIG. 3 shows a display device with a lateral side on which a pad is provided.

FIG. 3 shows a display device with a pad on a lateral side. As shown in FIG. 3, regarding the display device according to the present exemplary embodiment, a pad portion 700 is formed to the lateral side of the display panel. In the entire exemplary embodiment described in the present specification, the pad portion may be provided on the lateral side of the display panel.

There may be multiple pad portions 700, and a plurality of pad portions may contact the lateral side of the display panel. The pad portion 700 may be formed of a metal paste. The metal paste includes a mixture of a metal and an insulating material.

The pad portion 700 may be a silver paste.

The pad portion 700 may be electrically connected to a pad (DCB-P) in the circuit board (DCB) through the anisotropic conductive film (ACF). The anisotropic conductive film (ACF) may be replaced with a solder paste, and the pad portion 700 may be connected to the pad (DCB-P) in the circuit board (DCB) through conductive particles in the anisotropic conductive film (ACF) or the solder paste.

As the pad portion 700 is attached to the lateral side of the display panel, a process for grinding the lateral side of the display panel is needed before forming the pad portion on the lateral side of the display panel. When the display panel is ground as described above, the gate conductor 120 and the data conductor 170 are ground, and ground powders may be agglomerated together to form a sludge. That is, the gate conductor 120 and the data conductor 170 may include Cu, and the Cu particle generated during the grinding process may form a sludge between exposed layers.

Figure 4:
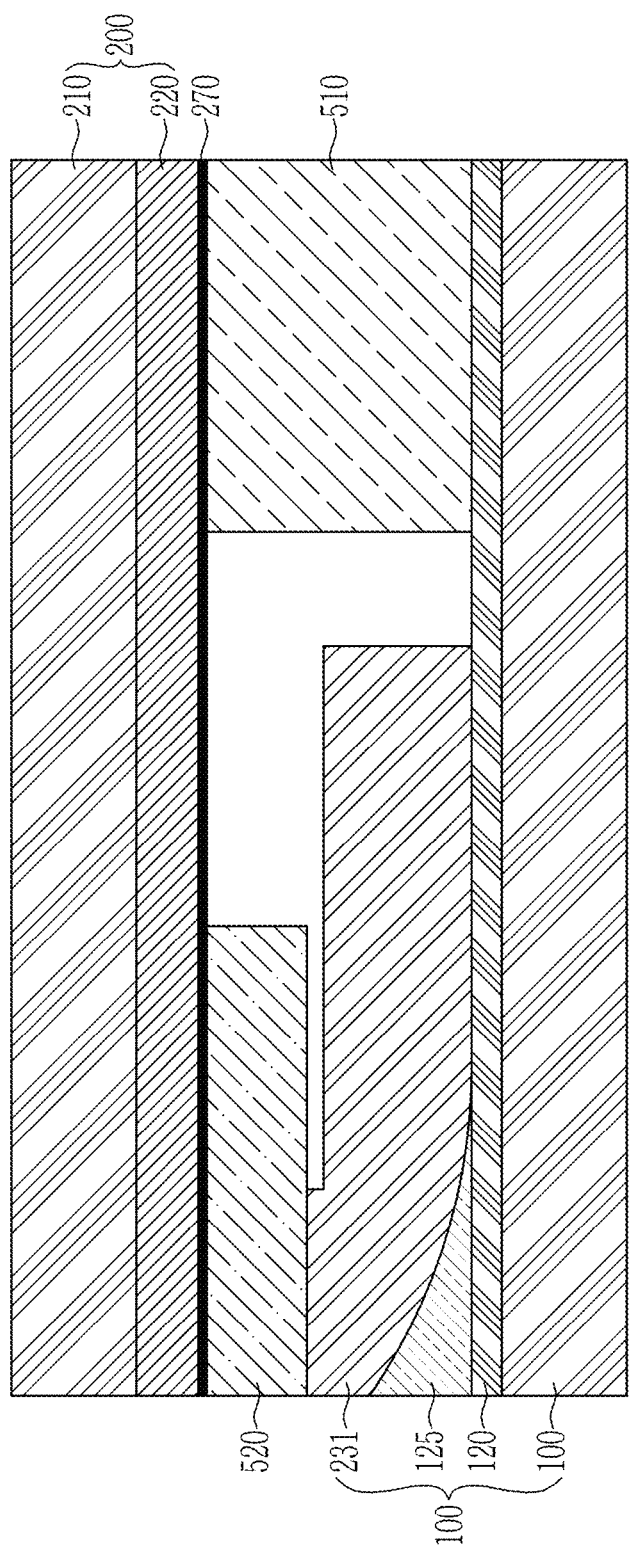
FIG. 4 shows a same cross-sectional view as FIG. 1 in a display device according to a comparative example of the present inventive concept.

FIG. 4 shows a same cross-sectional view as FIG. 1 in a display device according to a comparative example of the present inventive concept. Referring to FIG. 4, regarding the display device according to a comparative example of the present inventive concept, the first color filter layer 231 is provided on the outermost edge of the non-display area (NDA).

Referring to FIG. 4, a sludge layer 125 is formed between the gate conductor 120 and the first color filter layer 231. That is, the sludge formed during a grinding process of the lateral side of the display panel for the purpose of attaching the pad portion 700 is squeeze in between the gate conductor 120 and the first color filter layer 231 to thus form the sludge layer 125.

The sludge layer 125 may include copper, thus, it has conductivity, and contact resistance with the pad portion changes depending on an area where the sludge layer 125 is formed or a thickness thereof, thereby reducing reliability of the display device.

A depth and a thickness of the sludge layer 125 formed in the process of grinding the lateral side differs according to the distance between the first display panel 100 and the second display panel 200.

Figure 5:
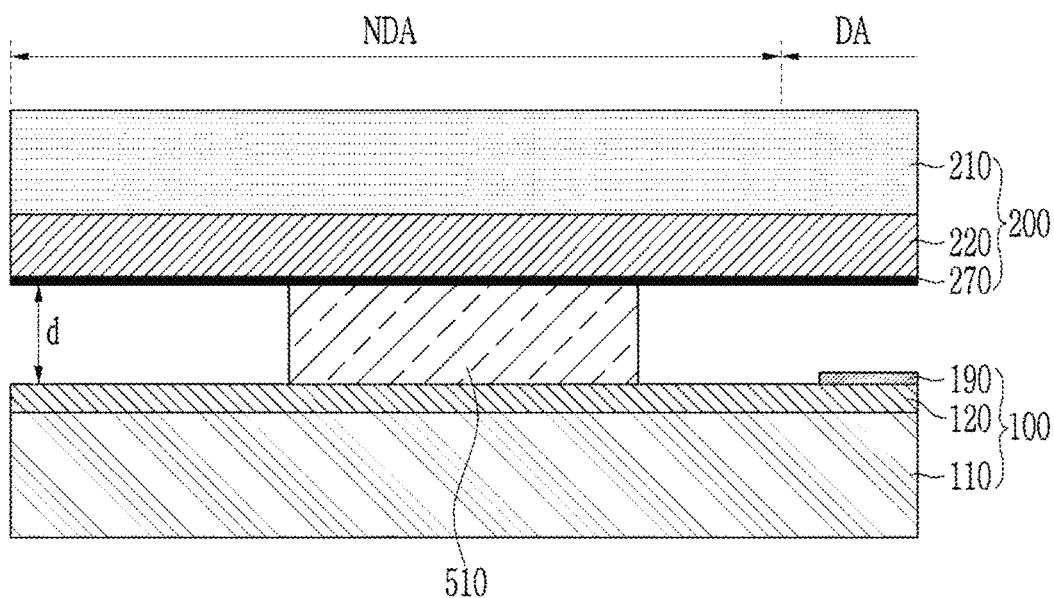
FIG. 5 shows a cross-sectional view of a display device tested for founding a relationship between an area of a sludge layer and a distance between a first display panel and a second display panel.

FIG. 5 shows a cross-sectional view of a display device that is tested for founding a relationship between an area of a sludge layer and a distance between a first display panel and a second display panel. Referring to FIG. 5, a test is performed at the outermost edge of the display panel without providing an additional structure between the first display panel 100 and the second display panel 200.

Figure 6:
FIG. 6 shows an image when a lateral side is ground by changing a distance between a first display panel and a second display panel.
Figure 6:
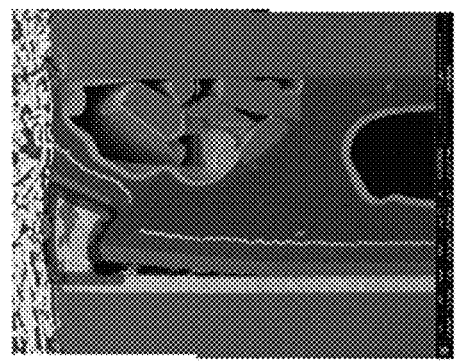
Figure 6:
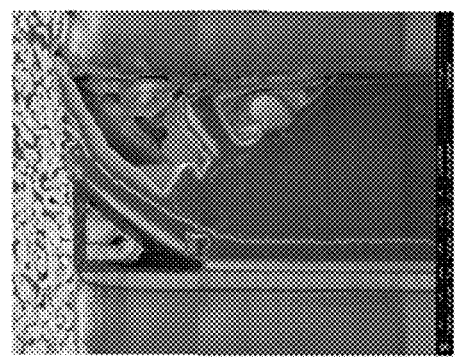
Figure 6:
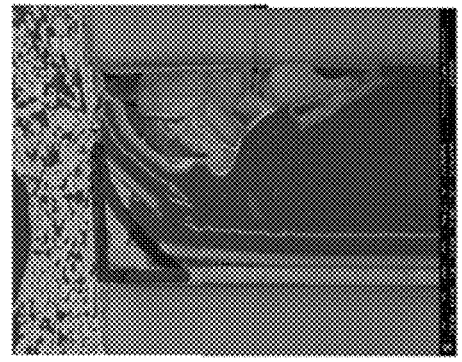

The lateral side of the display device having the structure shown in FIG. 5 is ground while changing the distance (d) between the first display panel 100 and the second display panel 200, and the result that the sludge layer is formed is shown in FIG. 6.

FIG. 6 shows an image when a lateral side is ground by changing a distance between a first display panel 100 and a second display panel 200. In FIG. 6, the distance d between the first display panel 100 and the second display panel 200 increases when it goes from left to right.

A region shown by thick lines in FIG. 6 represents a sludge layer. Referring to FIG. 6, it is found that the area occupied by the sludge layer increases as the distance d between the first display panel 100 and the second display panel 200 increases. That is, the area of the sludge layer formed during the grinding process of the lateral side of the display panel is influenced by the distance between the first display panel 100 and the second display panel 200.

The gap between the first display panel 100 and the second display panel 200 changes according to a stacked configuration of the display area (DA) of the display panel. In this instance, when the outermost edge of the display panel includes only one color filter layer, a space between the first display panel 100 and the second display panel 200 may increase as compared to a case when the outermost edge of the display panel includes more than one color filter layer.

That is, to prevent formation of the sludge layer 125 or uniformly control the same, the gap between the first display panel 100 and the second display panel 200 should be reduced. However, when only one color filter is included between the first display panel 100 and the second display panel 200 at the outermost edge of the display panel, the gap may increase. This is because the structures provided on the outermost edge of the non-display area (NDA) of the display panel are formed by the same process as the structure of the display area (DA), so the structures provided on the outermost edge of the non-display area (NDA) of the display panel may not have a thickness that is greater than that of the structure of the display area (DA).

When only one color filter layer is included on the outermost edge of the non-display area (NDA) and the space between the first display panel 100 and the second display panel 200 is not completely filled with a structure which includes conductive layers, color filters, a passivation layer, a column spacer and etc., the sludge layer may be formed as shown in FIG. 6 during the grinding process for grinding the lateral side of the display panel to form a flat surface on the lateral side of the display panel before forming a pad portion. Because of the sludge layer that is not uniformly formed, the contact resistance between the pad portion and a conductive layer on the panel changes, thereby reducing reliability of the display device.

However, the display device according to the present exemplary embodiment includes at least two color filters at the outermost portion of the non-display area (NDA) of the display panel. In this instance, the thicknesses of the respective color filter layers at the outermost portion of the non-display area (NDA) of the display panel may be controlled, so the space between the first display panel 100 and the second display panel 200 may be stably filled in the display device with various spaced distances without providing an additional mask.

Figure 7:
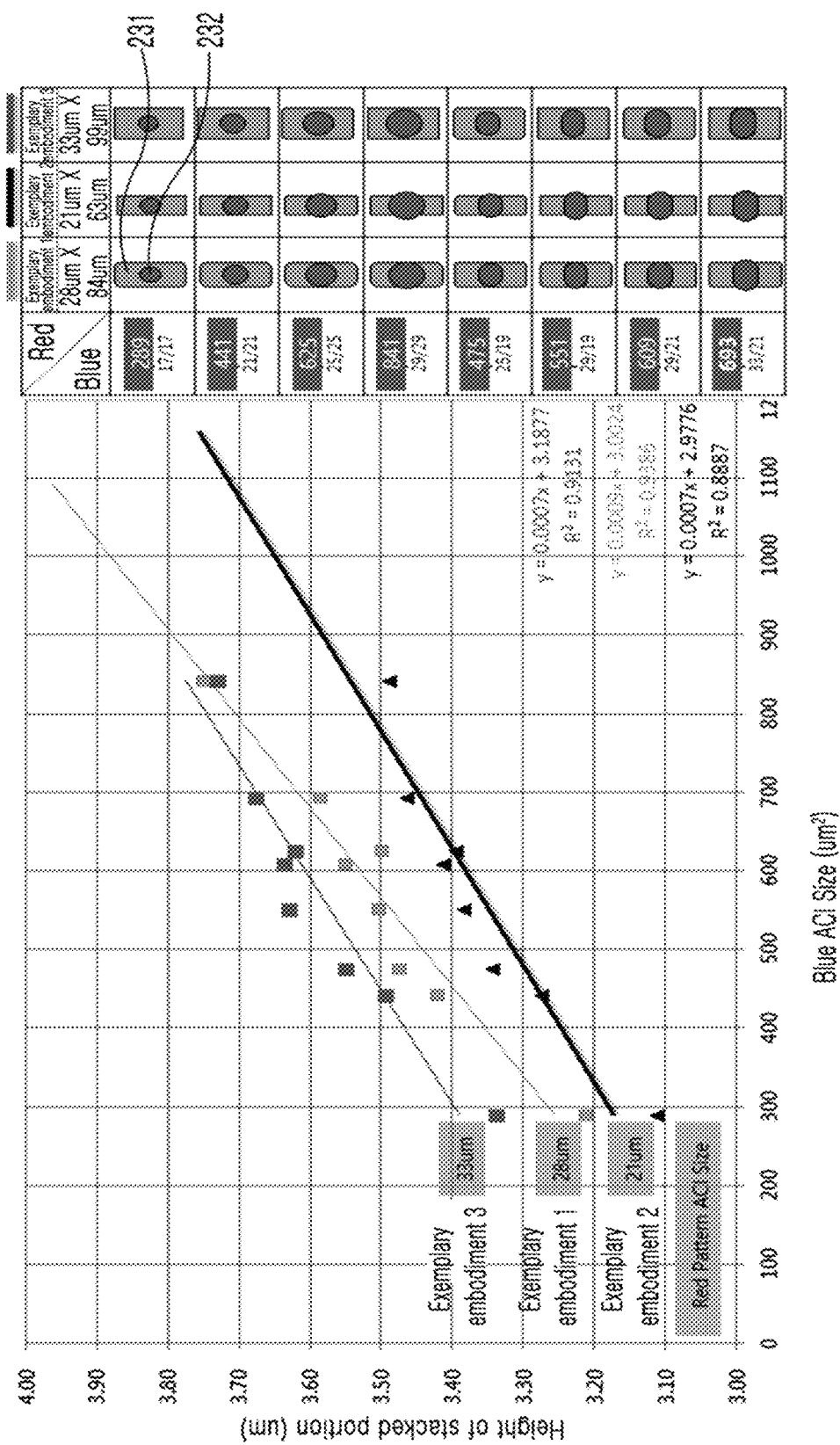
FIG. 7 shows a result of measuring a height of a stacked body of a first color filter layer and a second color filter layer while changing areas of a first color filter layer and a second color filter layer.

FIG. 7 shows results of measuring a height of a stacked body of the first color filter layer 231 and the second color filter layer 232 while changing areas of the first color filter layer 231 and the second color filter layer 232.

The first color filter layer 231 includes a red color filter layer, and the second color filter layer 232 includes a blue color filter layer.

In an Exemplary Embodiment 1, a height of the stacked portion is measured by changing a size of the blue color filter layer on the red color filter layer of 28 µm (horizontal)×84 µm (vertical). In this instance, the size of the blue color filter layer is variously changed within the range of 17 μm (horizontal)×17 μm (vertical) to 33 μm (horizontal)×21 μm (vertical).

As a result, it is found that the entire thickness also increases as the planar area of the blue color filter layer increases.

In a like manner, in an Exemplary Embodiment 2, the height of the stacked portion is measured by changing the size of the blue color filter layer on the red color filter layer with the size of 21 μm (horizontal)×63 μm (vertical). In this instance, the size of the blue color filter layer is variously changed within the range of 17 μm (horizontal)×17 μm (vertical) to 33 μm (horizontal)×21 μm (vertical). In this case, it is found that the entire thickness increases as the planar area of the blue color filter layer increases.

In an Exemplary Embodiment 3, the height of the stacked portion is measured by changing the size of the blue color filter layer on the red color filter layer with the size of 33 μm (horizontal)×99 μm (vertical), and it is found in this case that the entire thickness increases as the planar area of the blue color filter layer increases.

The heights of the color filter stacked body including at least two color filters may be controlled according to the areas of the respective color filter layers. Therefore, when the color filter layer on the non-display area (NDA) and the color filter on the display area (DA) are formed at the same time, the thickness of the color filter stacked body 235 may be controlled by controlling the planar area of the color filter layer formed at the outermost edge of the non-display area (NDA) without an additional mask.

Regarding the display device including the color filter stacked body 235 including at least two color filter layers on the outermost edge of the non-display area (NDA), its height may be controlled by controlling the area of the color filter layer, so that the space between the first display panel 100 and the second display panel 200 may be stably filled with the color filter stacked body 235 without using an additional mask. Therefore, formation of a sludge layer on the display panel may be prevented in the grinding process for grinding the lateral side of the display panel to form a flat surface on the lateral side of the display panel before forming a pad portion on the lateral side of the display panel, or formation of a sludge layer may be stably controlled depending on exemplary embodiments.

Figure 8:
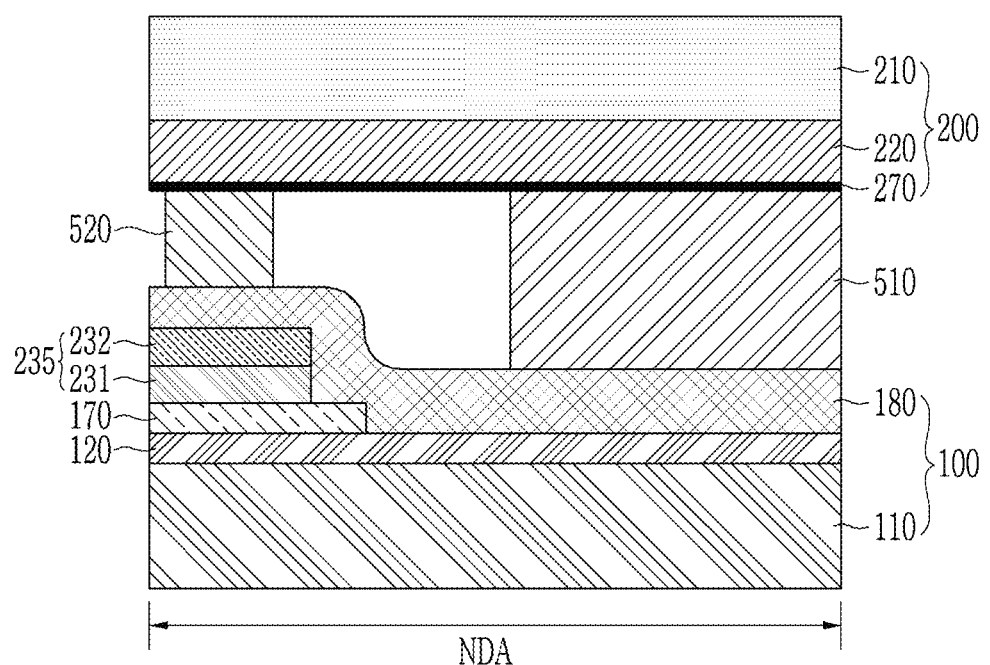
FIG. 8 shows a same cross-sectional view as FIG. 1 according to another exemplary embodiment of the present inventive concept.

Various other exemplary embodiments of the present inventive concept will now be described. FIG. 8 shows a same cross-sectional view as FIG. 1 according to another exemplary embodiment of the present inventive concept. The display device according to an exemplary embodiment described with reference to FIG. 8 corresponds to the display device according to an exemplary embodiment described with reference to FIG. 1, except for the sizes of the first color filter layer 231 and the second color filter layer 232. No detailed descriptions of the same constituent elements will be provided. Referring to FIG. 8, regarding the display device according to the present exemplary embodiment, the area of the first color filter layer 231 corresponds to the area of the second color filter layer 232. In this case, the color filter stacked body shown in FIG. 8 may be thicker than the color filter stacked body shown in FIG. 1. Therefore, when the distance between the first display panel 100 and the second display panel 200 is large, the space between them may be stably filled with the first color filter layer 231 and the second color filter layer 232.

The first color filter layer 231 may be a green color filter or a red color filter. The second color filter layer 232 may be a green color filter or a blue color filter. When the first color filter layer 231 is a red color filter, the second color filter layer 232 may be a green color filter or a blue color filter. When the first color filter layer 231 is a green color filter, the second color filter layer 232 may be a blue color filter.

Figure 9:
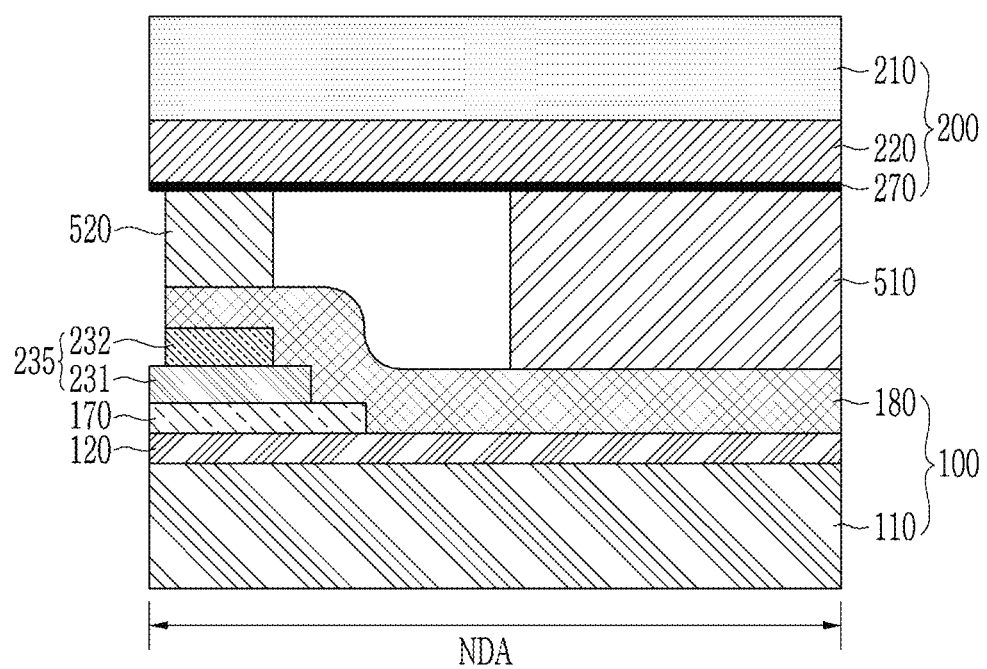
FIG. 9 shows a same cross-sectional view as FIG. 1 according to another exemplary embodiment of the present inventive concept.

FIG. 9 shows a same cross-sectional view as FIG. 1 according to another exemplary embodiment of the present inventive concept. The display device according to the exemplary embodiment of FIG. 9 corresponds to the display device according to the exemplary embodiment of FIG. 1 except for the sizes of the first color filter layer 231 and the second color filter layer 232. No detailed descriptions of the same constituent elements will be provided.

Referring to FIG. 9, regarding the display device according to the present exemplary embodiment, the area of the first color filter layer 231 is greater than the area of the second color filter layer 232. Therefore, as shown in FIG. 9, part of the first color filter layer 231 may not be overlapped with the second color filter layer 232. The first color filter layer 231 may be a green color filter or a red color filter. The second color filter layer 232 may be a green color filter or a blue color filter. When the first color filter layer 231 is a red color filter, the second color filter layer 232 may be a green color filter or a blue color filter. When the first color filter layer 231 is a green color filter, the second color filter layer 232 may be a blue color filter.

Figure 10:
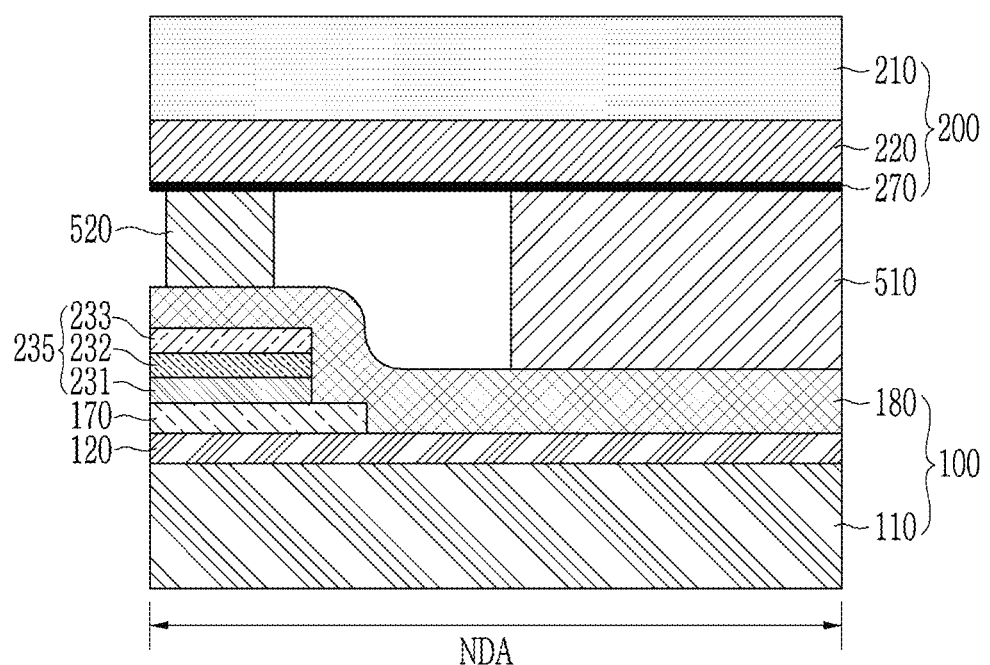
FIG. 10 shows a same cross-sectional view as FIG. 1 according to another exemplary embodiment of the present inventive concept.

FIG. 10 shows a same cross-sectional view as FIG. 1 according to another exemplary embodiment of the present inventive concept. The display device according to an exemplary embodiment of FIG. 10 corresponds to the display device according to the exemplary embodiment of FIG. 1, except that the color filter stacked body 235 includes a first color filter layer 231, a second color filter layer 232, and a third color filter layer 233. No detailed descriptions of the same constituent elements will be provided.

That is, the display device according to an exemplary embodiment of FIG. 10 includes a color filter stacked body 235 including a first color filter layer 231, a second color filter layer 232, and a third color filter layer 233 on the outermost edge of the non-display area (NDA) of the display device. Therefore, when the distance between the first display panel 100 and the second display panel 200 is large, the space between the display panels may be stably maintained.

The first color filter layer 231 may be a red color filter, the second color filter layer 232 may be a green color filter, and the third color filter layer 233 may be a blue color filter.

Figure 11:
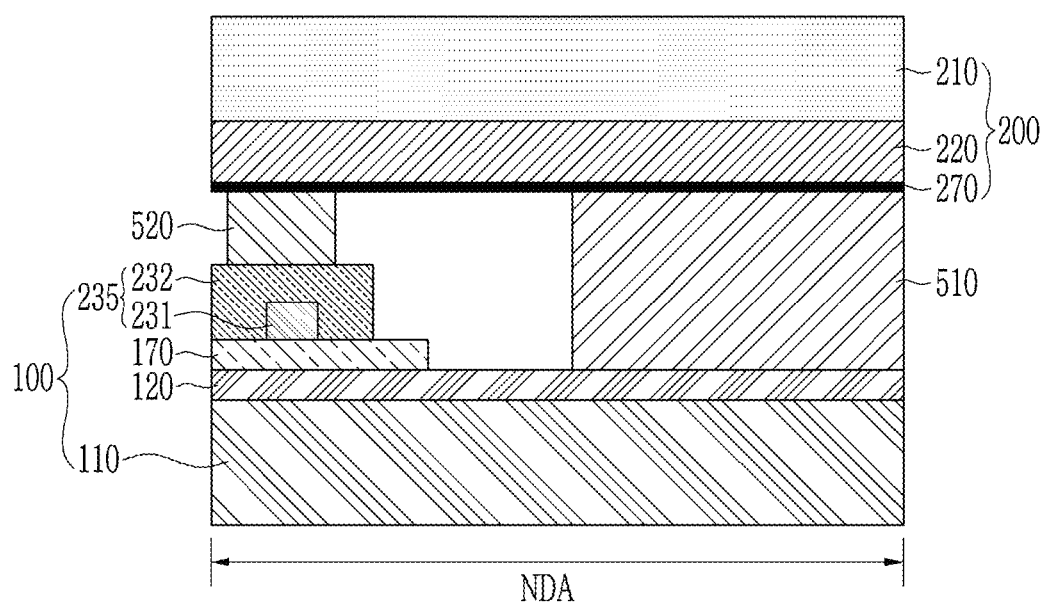
FIG. 11 shows a same cross-sectional view as FIG. 1 in a display device according to another exemplary embodiment of the present inventive concept.

FIG. 11 shows a same cross-sectional view as FIG. 1 in a display device according to another exemplary embodiment of the present inventive concept. Referring to FIG. 11, the display device according to the present exemplary embodiment corresponds to the display device according to the exemplary embodiment of FIG. 1, except that it does not include an organic layer 180. No detailed descriptions of the same constituent elements will be provided.

As shown in FIG. 11, the gap of the stacked body between the first display panel 100 and the second display panel 200 may be adjusted by including no organic layer 180 on the outermost edge of the non-display area of the display panel.

Figure 12:
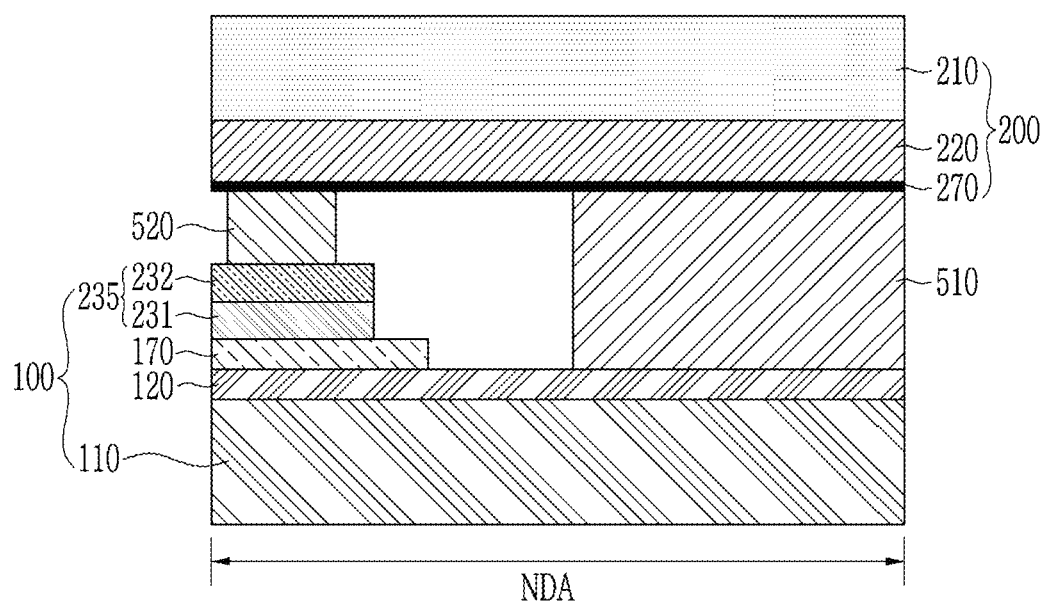
FIG. 12 shows a same cross-sectional view as FIG. 8 in a display device according to another exemplary embodiment of the present inventive concept.

FIG. 12 shows a same cross-sectional view as FIG. 8 in a display device according to another exemplary embodiment of the present inventive concept. Referring to FIG. 12, the display device according to the present exemplary embodiment corresponds to the display device according to an exemplary embodiment of FIG. 8, except that it includes no organic layer 180. No detailed descriptions of the same constituent elements will be provided.

Figure 13:
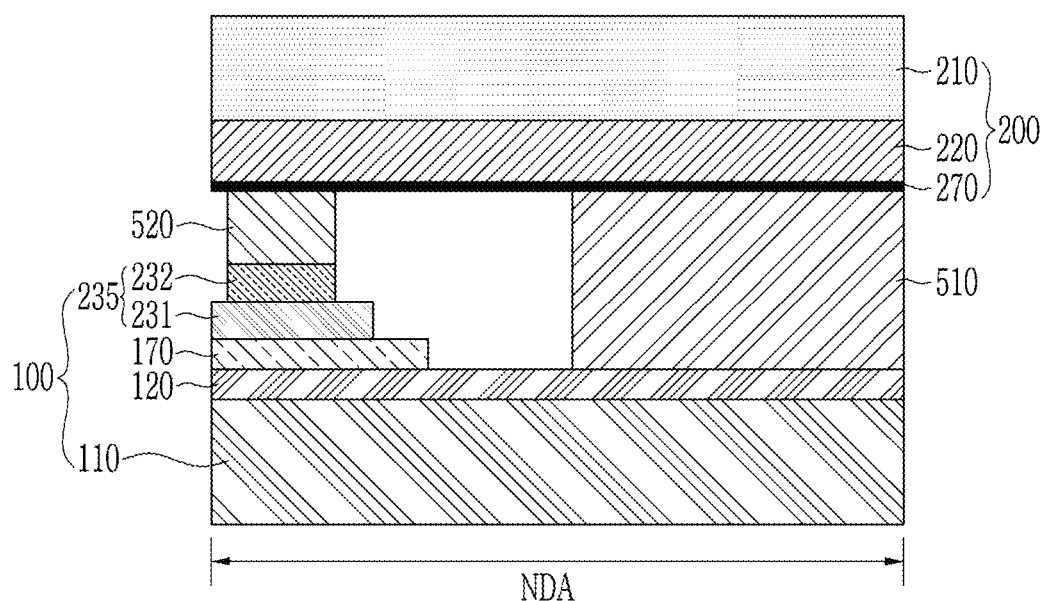
FIG. 13 shows a same cross-sectional view as FIG. 9 in a display device according to another exemplary embodiment of the present inventive concept.

FIG. 13 shows a same cross-sectional view as FIG. 9 in a display device according to another exemplary embodiment of the present inventive concept. Referring to FIG. 13, the display device according to the present exemplary embodiment corresponds to the display device according to an exemplary embodiment of FIG. 9 except that it includes no organic layer 180. No detailed descriptions of the same constituent elements will be provided.

Figure 14:
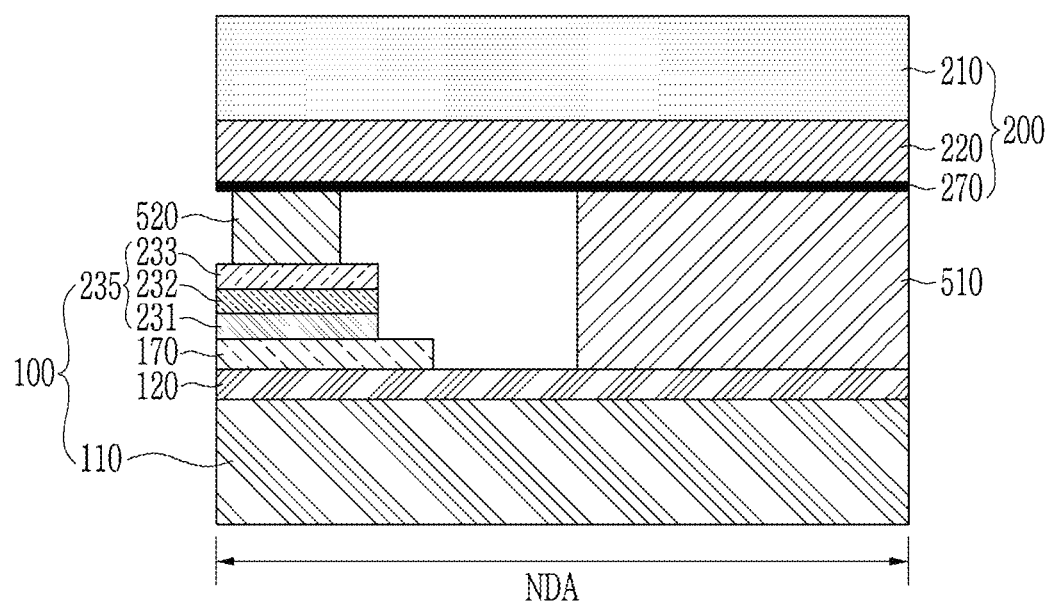
FIG. 14 shows a same cross-sectional view as FIG. 10 in a display device according to another exemplary embodiment of the present inventive concept.

FIG. 14 shows a same cross-sectional view as FIG. 10 in a display device according to another exemplary embodiment of the present inventive concept. Referring to FIG. 14, the display device according to the present exemplary embodiment corresponds to the display device according to an exemplary embodiment of FIG. 10, except that it includes no organic layer 180. No detailed descriptions of the same constituent elements will be provided.

Figure 15:
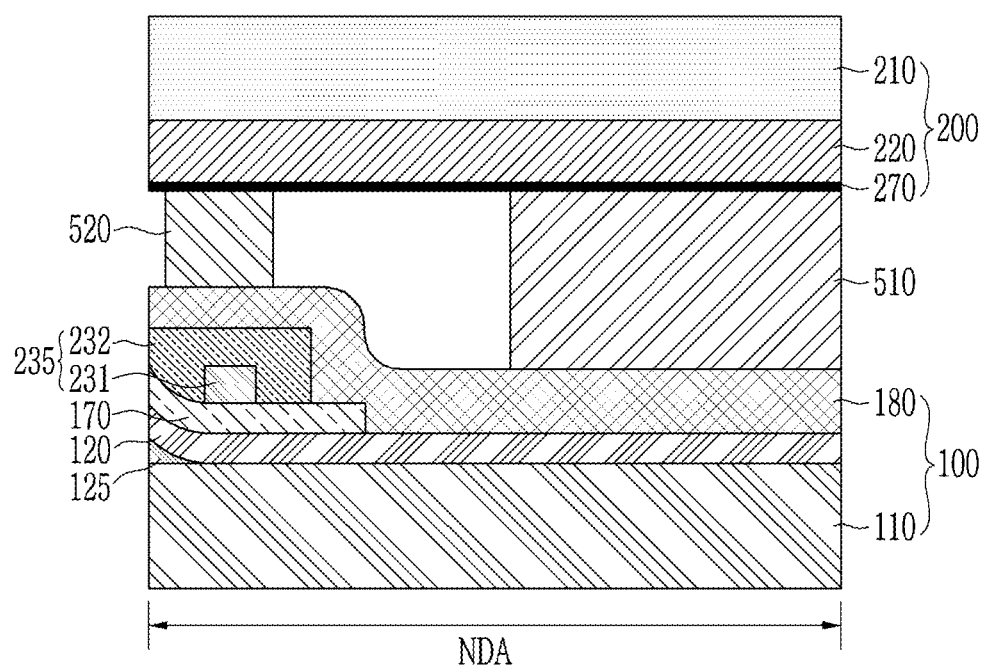
FIG. 15 shows a same cross-sectional view as FIG. 1 in a display device according to another exemplary embodiment of the present inventive concept.

FIG. 15 shows a same cross-sectional view as FIG. 1 in a display device according to another exemplary embodiment of the present inventive concept. Referring to FIG. 15, the display device according to the present exemplary embodiment corresponds to the display device according to an exemplary embodiment of FIG. 1, except that the sludge layer 125 is included between the first substrate 110 and the gate conductive layer 120. No detailed descriptions of the same constituent elements will be provided.

Referring to FIG. 15, regarding the display device according to the present exemplary embodiment, the sludge layer 125 is provided between the substrate 110 and the gate conductive layer 120. The sludge layer 125 may include copper (Cu). That is, the sludge layer 125 may be formed when the gate conductive layer 120 and the data conductive layer 170 are ground in the grinding process for grinding the lateral side of the display panel to form a flat surface on the lateral side of the display panel before forming a pad portion on the lateral side of the display panel.

When the thickness for forming a sludge layer 125 is not uniformly controlled, the contact resistance between the pad portion and the conductive layer on the display panel is not uniformly controlled, which is inappropriate. However, the display device according to the present exemplary embodiment may control the thickness of forming the sludge layer 125 since the color filter stacked body 235 including at least two color filter layers is provided on the outermost edge of the non-display area (NDA) of the display panel. That is, the thickness and the depth of forming the sludge layer 125 may be controlled by controlling the stacked thickness of at least two color filter layers, and the uniformly controlled sludge layer 125 reduces deviation in resistance when forming the pad portion, which is appropriate.

Figure 16:
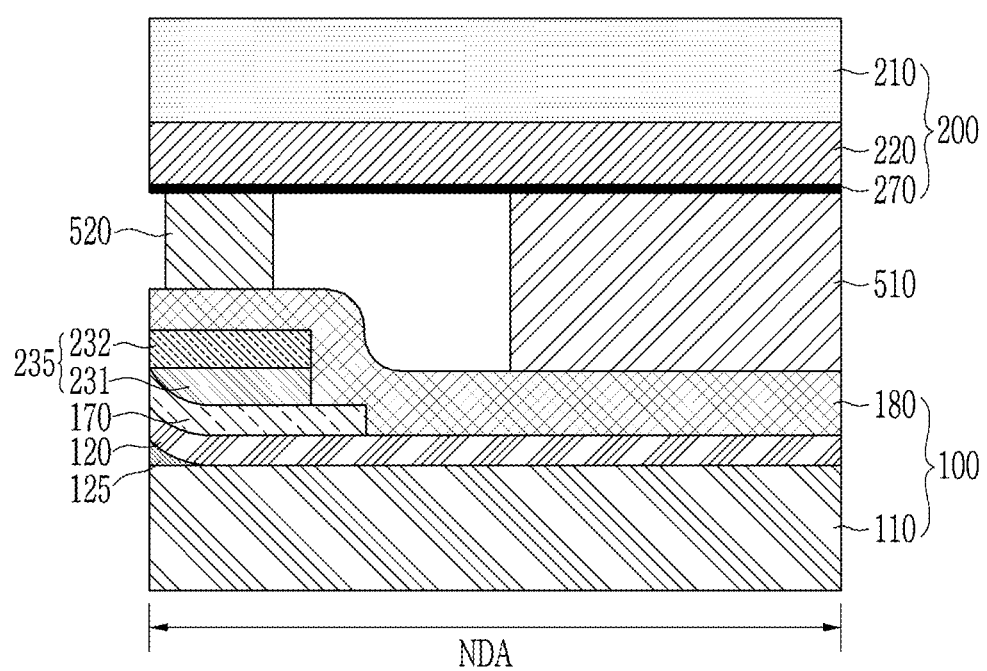
FIG. 16 shows a same cross-sectional view as FIG. 8 in a display device according to another exemplary embodiment of the present inventive concept.

FIG. 16 shows a same cross-sectional view as FIG. 8 in a display device according to another exemplary embodiment of the present inventive concept. Referring to FIG. 16, the display device according to the present exemplary embodiment corresponds to the display device according to an exemplary embodiment of FIG. 8, except that the sludge layer 125 is included between the first substrate 110 and the gate conductive layer 120. No detailed descriptions of the same constituent elements will be provided. Effects caused by using the sludge layer 125 correspond to the description provided according to an exemplary embodiment with reference to FIG. 15, so they will be omitted.

Figure 17:
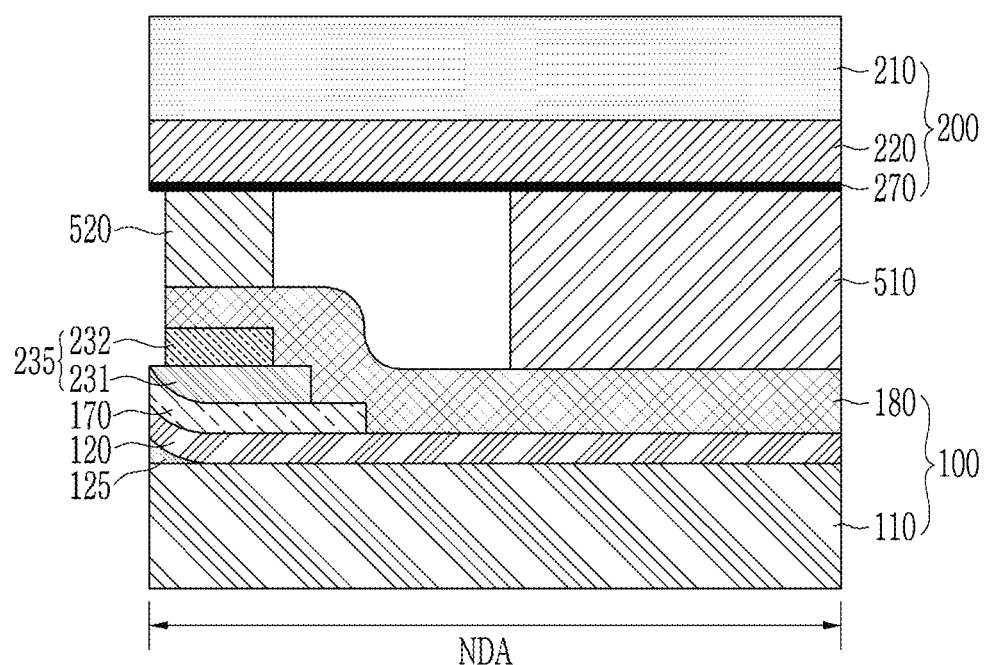
FIG. 17 shows a same cross-sectional view as FIG. 9 in a display device according to another exemplary embodiment of the present inventive concept.

FIG. 17 shows a same cross-sectional view as FIG. 9 in a display device according to another exemplary embodiment of the present inventive concept. Referring to FIG. 17, the display device according to the present exemplary embodiment corresponds to the display device according to an exemplary embodiment described with reference to FIG. 9, except that the sludge layer 125 is included between the first substrate 110 and the gate conductive layer 120. No detailed descriptions of the same constituent elements will be provided. Effects caused by using the sludge layer 125 correspond to the description provided according to an exemplary embodiment with reference to FIG. 15, so they will be omitted.

Figure 18:
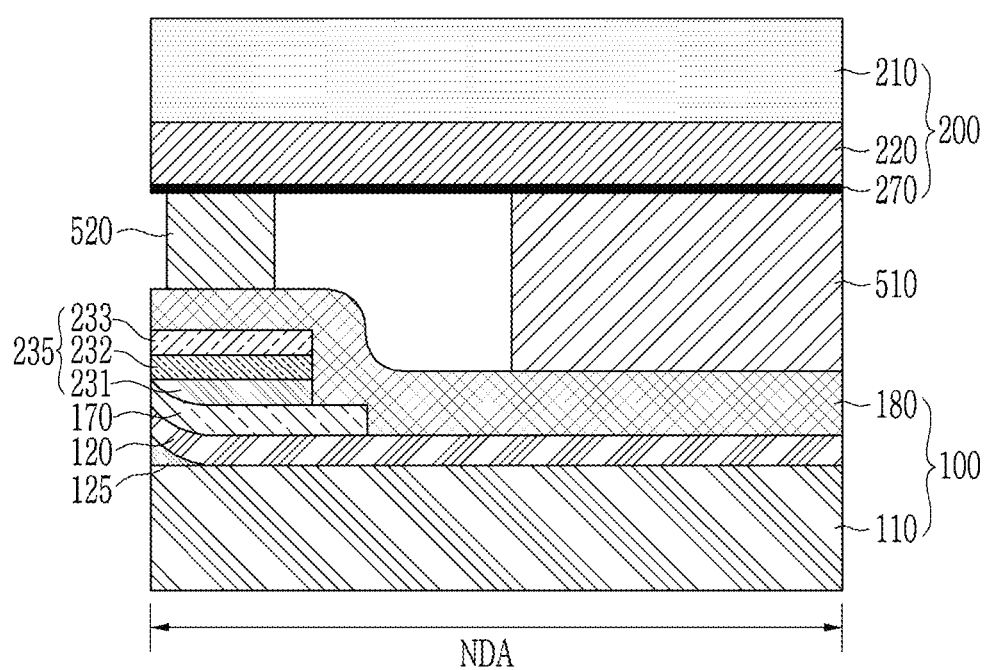
FIG. 18 shows a same cross-sectional view as FIG. 10 in a display device according to another exemplary embodiment of the present inventive concept.

FIG. 18 shows a same cross-sectional view as FIG. 10 in a display device according to another exemplary embodiment of the present inventive concept. Referring to FIG. 18, the display device according to the present exemplary embodiment corresponds to the display device according to an exemplary embodiment described with reference to FIG. 10, except that the sludge layer 125 is included between the first substrate 110 and the gate conductive layer 120. No detailed descriptions of the same constituent elements will be provided. Effects caused by using the sludge layer 125 correspond to the description provided according to an exemplary embodiment with reference to FIG. 15, so they will be omitted.

A stacked configuration of the display area (DA) of the display device according to an exemplary embodiment of the present inventive concept will now be described in detail with reference to drawings. However, this is an example, and the stacked configuration of the display area (DA) is not limited to the drawings and exemplary embodiments to be described below.

Figure 19:
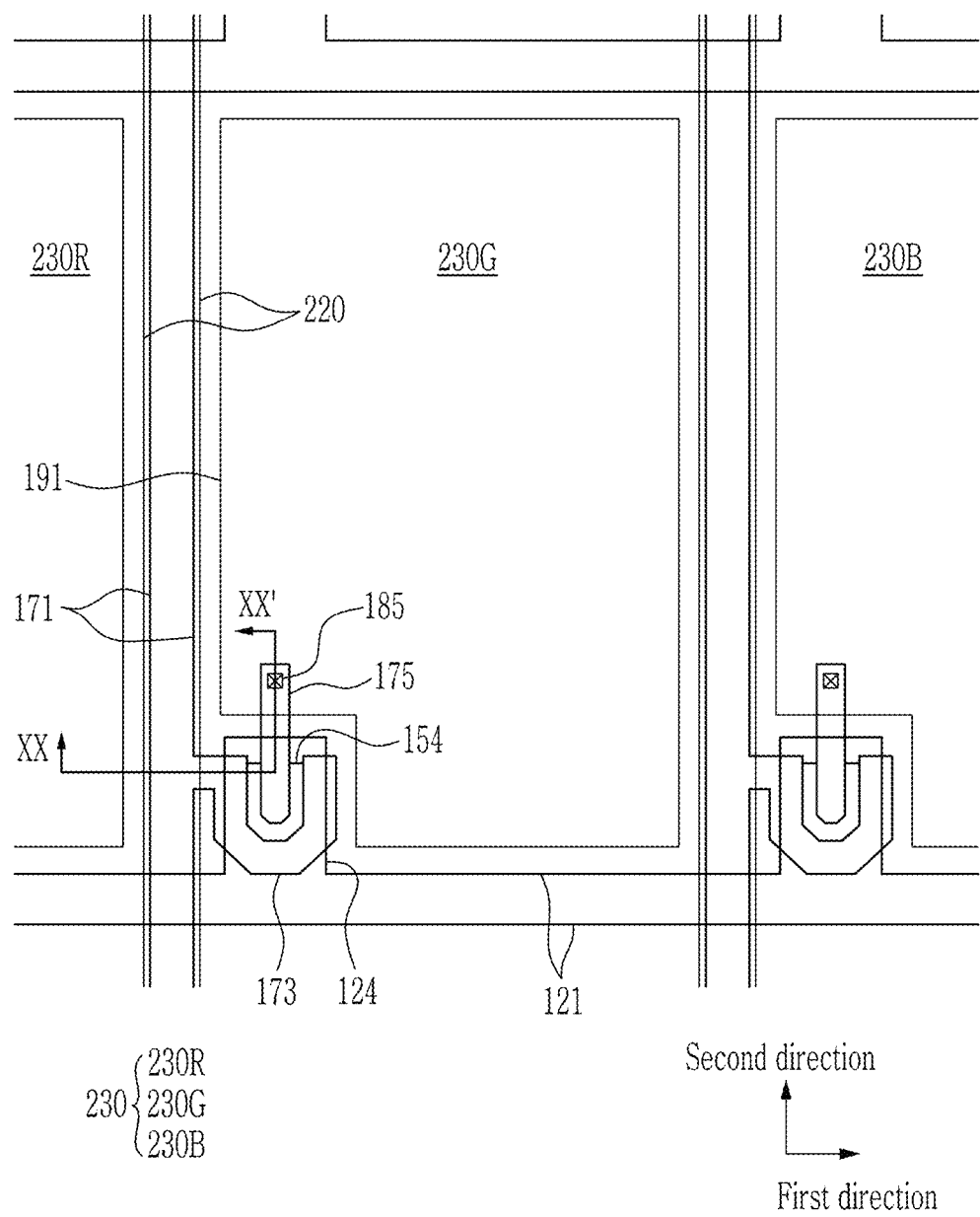
FIG. 19 shows a layout view of a display device according to an exemplary embodiment of the present inventive concept.
Figure 20:
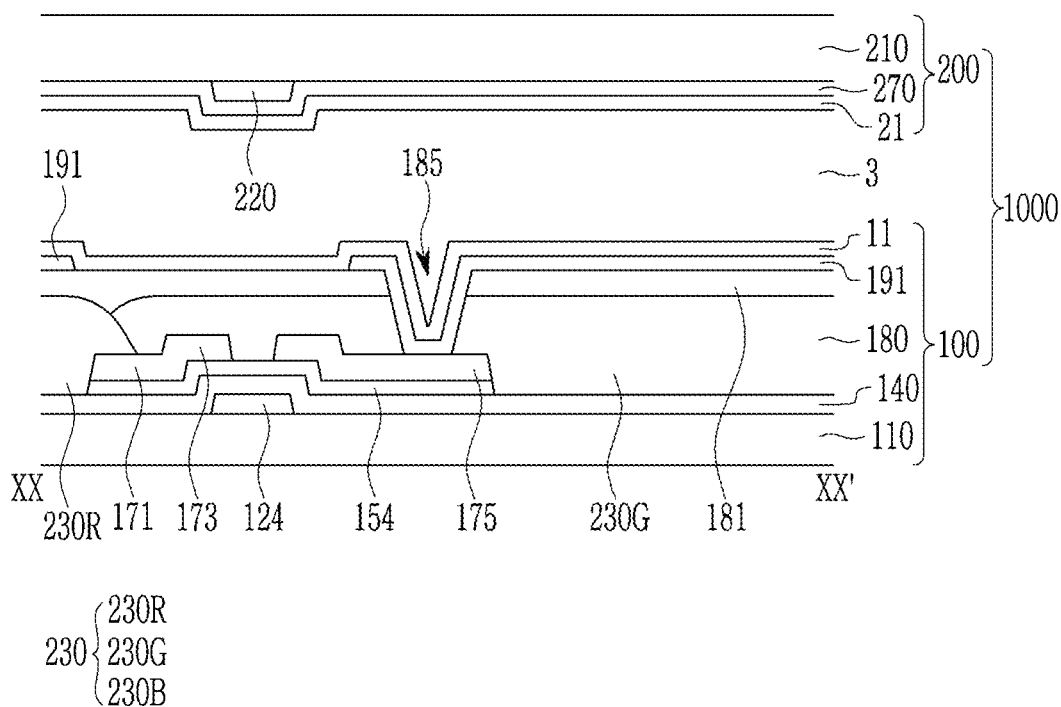
FIG. 20 shows a cross-sectional view of a display device of FIG. 19 with respect to a line XX-XX'.

FIG. 19 shows a layout view of a display device according to an exemplary embodiment of the present inventive concept, and FIG. 20 shows a cross-sectional view of a display device of FIG. 19 with respect to a line XX-XX'.

Referring to FIG. 19 and FIG. 20, the display panel 1000 includes a first display panel 100 and a second display panel 200 overlapping the first display panel 100, and a liquid crystal layer 3 provided between the first display panel 100 and the second display panel 200.

The first display panel 100 will now be described. A gate conductor including a gate line 121 and a gate electrode 124 is provided on the first substrate 110 made of transparent glass or plastic.

The gate line 121 may extend in a first direction. The gate conductor may include various sorts of metals or conductors, and it may have a multilayer structure.

The gate line 121 and the gate electrode 124 may be formed in the same process as that of the gate conductive layer 120 of the non-display area (NDA), and they may include a same material.

A gate insulating layer 140 is provided between the gate conductor and the liquid crystal layer 3. The gate insulating layer 140 may include an inorganic insulating material.

A semiconductor layer 154 is provided on one side of the gate insulating layer 140.

A data line 171 is provided between the semiconductor layer 154 and the liquid crystal layer 3, and it extends in a second direction to traverse the gate line 121. A source electrode 173 may extend from the data line 171 and may overlap the gate electrode 124. A drain electrode 175 is disposed spaced apart from the data line 171 to face the source electrode 173, and as shown in FIG. 19, it may have a bar shape extending toward a center of the source electrode 173. The data line 171 may be formed with the same process as the data conductive layer 170 in the non-display area (NDA), and it may include a same material.

Part of the semiconductor layer 154 may not overlap the data line 171 and the drain electrode 175 in a region between the source electrode 173 and the drain electrode 175. The semiconductor layer 154 may have a substantially same planar shape as the data line 171 and the drain electrode 175, except for a channel region disposed between the drain electrode 175 and the source electrode 173.

One gate electrode 124, one source electrode 173, and one drain electrode 175 configure one thin film transistor together with the semiconductor layer 154, and a channel of the thin film transistor represents a region of the semiconductor layer 154 between the source electrode 173 and the drain electrode 175.

A color filter 230 is provided between the liquid crystal layer 3 and the source electrode 173, and the liquid crystal layer 3 and the drain electrode 175. The color filter 230 may include a red color filter 230R, a green color filter 230G, and a blue color filter 230B.

One first electrode 191 is provided in a space partitioned by adjacent gate lines 121 and adjacent data lines 171 to form one pixel region, and a color filter 230 may be disposed for each pixel to overlap the one first electrode 191.

Each of the color filter 230 may be formed with the same process as the color filter layer provided on the outermost edge of the non-display area (NDA).

A passivation layer 181 may be provided on the color filter. The passivation layer 181 may include an organic insulating material and a low-permittivity insulating material. When the passivation layer 181 includes an organic material, the passivation layer 181 may extend to the non-display area (NDA) to form an organic layer 180.

The color filter 230 and the passivation layer 181 include a contact hole 185 overlapping part of the drain electrode 175.

The first electrode 191 is provided between the passivation layer 181 and the liquid crystal layer 3. The first electrode 191 is physically and electrically connected to the drain electrode 175 through the contact hole 185, and receives a data voltage from the drain electrode 175. The first electrode 191 may be a pixel electrode.

A first alignment layer 11 is provided between the first electrode 191 and the liquid crystal layer 3.

An end of the first alignment layer 11 may be provided to overlap the sealant 510 shown in FIG. 1. That is, the first alignment layer 11 of the display area (DA) may extend to overlap a center region of the sealant 510 of the non-display area (NDA). That is, the first alignment layer 11 may be provided between the organic layer 180 and the sealant 510, and part of the sealant 510 may not overlap the first alignment layer 11.

The second display panel 200 includes a second substrate 210, a light blocking layer 220, a second electrode 270, and a second alignment layer 21.

The second electrode 270 is provided on one side of the second substrate 210. The second electrode 270 may be a common electrode.

The light blocking layer 220 is provided between the second substrate 210 and the second electrode 270. The light blocking layer 220 may overlap the data line 171 which extends in the second direction. Although not shown, the light blocking layer may further include a horizontal portion overlapping the gate line 121 and extending in the first direction. The light blocking layer 220 may be omitted.

The second alignment layer 21 is provided between the second electrode 270 and the liquid crystal layer 3.

The display device according to an exemplary embodiment of the present inventive concept provides the color filter stacked body including at least two color filter layers on the outermost edge of the non-display area of the display panel to which the pad portion is attached, thereby filling a space between the first display panel 100 and the second display panel 200 when the distance between the first display panel 100 and the second display panel 200 changes. Therefore, formation of sludge may be prevented during the grinding process for grinding the lateral side of the display panel to form a flat surface on the lateral side of the display panel when forming a pad portion to the lateral side, or the sludge may be controlled to be uniformly formed.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A display device comprising:
a first substrate including a display area and a non-display area;
a plurality of thin film transistors disposed on the first substrate and each connected to a gate conductive layer and a data conductive layer;
a second substrate overlapping the first substrate;
a sealant disposed between the first substrate and the second substrate; and
a stacked body disposed between the first substrate and the second substrate, disposed on an outermost edge of the non-display area, and disposed spaced apart from the sealant,
wherein the stacked body includes the gate conductive layer, the data conductive layer, a column spacer and a color filter stacked body including at least two color filters,
wherein the gate conductive layer, the data conductive layer, the color filter stacked body and the column spacer are sequentially disposed on the first substrate,
wherein the gate conductive layer directly contacts the data conductive layer on the outmost edge of the non-display area, and
wherein a direct contact region of the gate conductive layer and the data conductive layer overlaps the color filter stacked body.
2. The display device of claim 1, wherein
the color filter stacked body includes a first color filter and a second color filter overlapping each other in a plan view, and
the first color filter is disposed closer to the first substrate than the second color filter is.
3. The display device of claim 2, wherein,
when the first color filter is red, the second color filter is green or blue, and
when the first color filter is green, the second color filter is blue.
4. The display device of claim 2, wherein
an area of the second color filter is greater than an area of the first color filter, and
a top surface and a side surface of the first color filter is completely covered by the second color filter.
5. The display device of claim 2, wherein
an area of the first color filter corresponds to an area of the second color filter.
6. The display device of claim 2, wherein
an area of the second color filter is lesser than an area of the first color filter.
7. The display device of claim 1, wherein
the color filter stacked body includes a first color filter, a second color filter, and a third color filter.

8. The display device of claim 1, wherein
a space between the sealant and the stacked body is filled with air.

9. The display device of claim 1, further comprising
a pad portion disposed on a lateral side of the stacked body, and contacting a gate conductive layer and a data conductive layer on the lateral side.

10. The display device of claim 1, wherein
the stacked body further includes a light blocking member disposed on the second substrate, and
a second electrode disposed on the light blocking member.

11. The display device of claim 1, wherein
the column spacer and a lateral side of the color filter stacked body are exposed on the outermost edge.

12. The display device of claim 1, wherein
a thickness of a column spacer in the non-display area is equal to or less than a thickness of a column spacer in the display area.

13. The display device of claim 1, wherein
a thickness of a color filter in the non-display area is equal to or less than a thickness of a color filter in the display area.

14. A display device comprising:
a first substrate including a display area and a non-display area;
a plurality of thin film transistors disposed on the first substrate and each connected to a gate conductive layer and a data conductive layer;
a second substrate overlapping the first substrate;
a sealant disposed between the first substrate and the second substrate; and
a stacked body disposed between the first substrate and the second substrate, disposed on an outermost edge of the non-display area, and disposed spaced apart from the sealant,
wherein the stacked body includes the gate conductive layer, the data conductive layer, a color filter stacked body which includes a first color filter and a second color filter, an organic layer, and a column spacer,
wherein the gate conductive layer, the data conductive layer, the color filter stacked body and the column spacer are sequentially disposed on the first substrate,
wherein the gate conductive layer directly contacts the data conductive layer on the outmost edge of the non-display area, and
wherein a direct contact region of the gate conductive layer and the data conductive layer overlaps the color filter stacked body.

15. The display device of claim 14, wherein
the organic layer is disposed between the color filter stacked body and the column spacer.

16. The display device of claim 14, wherein
an area of the second color filter is greater than an area of the first color filter, and
a top surface and a side surface of the first color filter is completely covered by the second color filter.

17. The display device of claim 14, wherein
an area of the first color filter corresponds to an area of the second color filter.

18. The display device of claim 14, wherein
an area of the second color filter is less than an area of the first color filter.

19. The display device of claim 14, wherein
the color filter stacked body further includes a third color filter disposed on the second color filter.

20. The display device of claim 14, further comprising
a pad portion disposed on a lateral side of the stacked body, and contacting the gate conductive layer and the data conductive layer on the lateral side.

21. A display device comprising:
a first substrate including a display area and a non-display area;
a plurality of thin film transistors disposed on the first substrate and each connected to a gate conductive layer and a data conductive layer;
a second substrate overlapping the first substrate;
a sealant disposed between the first substrate and the second substrate;
a stacked body disposed between the first substrate and the second substrate, disposed on an outermost edge of the non-display area, and disposed spaced apart from the sealant; and
a sludge layer disposed between the stacked body and the first substrate,
wherein the stacked body includes the gate conductive layer, the data conductive layer, a color filter stacked body which includes a first color filter and a second color filter, and a column spacer,
wherein the gate conductive layer, the data conductive layer, the color filter stacked body and the column spacer are sequentially disposed on the first substrate,
wherein the gate conductive layer directly contacts the data conductive layer on the outmost edge of the non-display area, and
wherein a direct contact region of the gate conductive layer and the data conductive layer overlaps the color filter stacked body.

22. The display device of claim 21, wherein
the sludge layer includes copper.

23. The display device of claim 21, wherein
the sludge layer is disposed between the gate conductive layer and the first substrate.

24. The display device of claim 23, further comprising
a pad portion disposed on a lateral side of the stacked body, and contacting the sludge layer, the gate conductive layer, and the data conductive layer on the lateral side.

25. The display device of claim 21, wherein
an area of the second color filter is greater than an area of the first color filter, and
a top surface and a side surface of the first color filter is completely covered by the second color filter.

26. The display device of claim 21, wherein
an area of the first color filter corresponds to an area of the second color filter.

27. The display device of claim 21, wherein
an area of the second color filter is lesser than an area of the first color filter.

28. The display device of claim 21, wherein
the color filter stacked body further includes a third color filter disposed on the second color filter.

* * * * *